United States Patent [19]

Springer

[11] Patent Number: 4,531,127
[45] Date of Patent: Jul. 23, 1985

[54] TESTER FOR AIRCRAFT ALTITUDE REPORTING SYSTEM

[76] Inventor: Earl W. Springer, 1713 S. Manhattan Ave., Tampa, Fla. 33629

[21] Appl. No.: 598,442

[22] Filed: Apr. 9, 1984

[51] Int. Cl.³ .............................................. G01S 7/40
[52] U.S. Cl. .................................................. 343/17.7
[58] Field of Search ....................................... 343/17.7

[56] References Cited

U.S. PATENT DOCUMENTS

| | | | |
|---|---|---|---|
| 3,110,026 | 11/1963 | Barbour, Jr. et al. | 343/17.7 |
| 3,553,586 | 1/1971 | Cribb | 343/17.7 |
| 3,604,000 | 9/1971 | Briana et al. | 343/17.7 |
| 3,697,876 | 10/1972 | Robbins et al. | 343/17.7 |
| 4,121,213 | 10/1978 | Bush et al. | 343/17.7 |

*Primary Examiner*—T. H. Tubbesing
*Attorney, Agent, or Firm*—Barnes & Thornburg

[57] ABSTRACT

A ground test system for an aircraft altitude reporting system includes a ramp tester, an antenna coupled to the ramp tester and a switch for interrupting the circuit between the ramp tester and the antenna.

10 Claims, 2 Drawing Figures

TESTER FOR AIRCRAFT ALTITUDE REPORTING SYSTEM

This invention relates to aircraft altitude reporting systems, and more particularly to aircraft altitude reporting system testers or "ramp testers" that interrogate the transponder systems of aircraft to simulate actual flying conditions.

The Federal Aviation Administration requires that the entire automatic radar altitude reporting system in an aircraft be tested for accuracy every two years. In addition to having the craft's altimeter recertified, the aircraft transponder system must be tested to assure that it is transmitting the correct information from the aircraft to the ground controller. The equipment that has been developed to test the aircraft's automatic altitude reporting systems includes equipment which is known as a "ramp tester." A ramp tester includes a portable antenna to which an interrogator is connected, which is then used to interrogate the transponder system of the aircraft. The ramp tester also includes a device for driving the altimeter through its operating range.

The ramp testers used to interrogate the transponder systems of aircraft have been shown to produce errors in certain circumstances in the testing of altitude reporting systems of aircraft. It is believed that, under these limited circumstances, these ramp testers in conjunction with the grounded transponder system of the aircraft do not completely simulate the actual in-flight conditions in which the transponder operates. In use, the interrogator of the ramp tester exercises the transponder system through a complete altitude range. The aircraft's encoded altimeter readings received from the transponder by the interrogator are then compared to readings of a ground test altimeter to check for any deviations in response from the craft's transponder system. The ramp tester is normally operated at a pulse repetition frequency of less than 250 cycles to avoid possible interference with the interrogator of an airport's control tower. This is important since ramp testing generally takes place at an airport facility where altitude reporting of aircraft in flight is ocurring simultaneously with the ramp testing.

The occurrence of these occasional errors has been discovered when transponders which completely satisfy the ramp test fail to report accurately in flight, occasionally giving spurious readings. Conventional testing systems fail to detect these erroneous outputs by the transponder during on-ground testing of the automatic altitude reporting system. The exact source of these spurious readings has not been pinpointed, but they may be caused by some interaction of the sweep of the radar signal across the antenna of the aircraft and the radar's beam pattern. The present ramp testing methods fail to take the radar sweep rate and beam pattern into account. None of the ground testing methods or equipment presently available are designed to take into account the effect that the radar's sweep rate and beam pattern have on an aircraft's transponder system.

It is therefore an object of the present invention to provide an improved ramp tester that more effectively tests aircraft transponder systems.

It is another object of the present invention to provide an improved ramp tester that more effectively simulates actual flight conditions for ground testing of aircraft transponder systems.

It is yet another object of the present invention to provide a ramp tester that takes into account the sweep rate and active beam pattern of a ground station's radar to obtain more reliable test results from such testing procedures.

It is another object of the present invention to provide a test method for aircraft transponder systems that takes into account the sweep rate and active beam pattern of a ground station's radar.

Therefore, an improved aircraft altitude reporting system tester in accordance with the present invention includes a ramp test generator, an antenna and means for coupling the generator to the antenna. Means are provided for modifying the tester's signal such that it more effectively simulates the actual in-flight conditions to which the aircraft's transponder system is exposed.

An improved aircraft altitude reporting system in accordance with the present invention includes a ramp test generator, an antenna and means for coupling the generator to the antenna. The coupling means includes means for interrupting the path between the ramp test generator and the antenna.

According to the illustrated embodiment of the present invention, the means for interrupting the path between the ramp test generator and antenna includes a power source, a motor, a variable speed control, and a speed reducer, all driving a switch that causes an intermittent interruption of the circuit between the ramp test generator and the transponder system under investigation, by switching the circuit between the generator and the antenna.

A test method in accordance with the present invention includes connecting an aircraft's altimeter to a variable pressure source, varying the pressure over an altitude range, interrogating the aircraft's transponder system with a signal that is intermittently interrupted, and comparing the transponder's response to an altitude reading based upon the pressure.

Features and advantages of the invention will become apparent to those skilled in the art upon consideration of the following detailed description of a preferred embodiment exemplifying the best mode of carrying out the invention as presently perceived. The detailed description particularly refers to the accompanying figures in which.

Transponder communication involves transmission to an aircraft of an interrogate signal, and response by the aircraft's transponder by transmission to the ground station of various types of information including encoded aircraft altitude information. The encoded altitude information comprises time-division multiplexed signals indicative of altitude. These signals are pulses of extremely short duration. The pulses are spaced in time to provide a variety of signal combinations representative of different altitudes.

In use, the transponder is interrogated by the ground station, normally an air traffic control station, and if the interrogate signal is recognized by the transponder, it responds with the time-division multiplexed signals which can be decoded into the aircraft's altimeter reading by the ground station.

As previously stated the Federal Aviation Administration requires that the entire radar altitude reporting system in an aircraft that provides automatic altitude reporting, be tested for accuracy every two years. In addition to having the craft's altimeter recertified, the aircraft transponder system must be tested to assure that it is transmitting the correct information from the aircraft to the ground controller.

Figure 1:
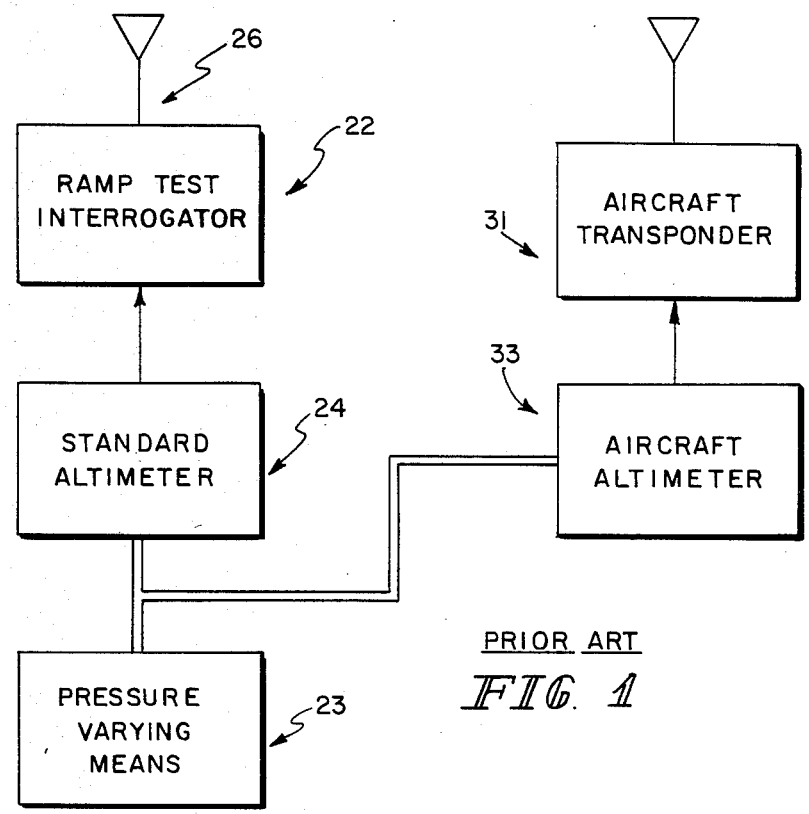
FIG. 1 is a block diagram of a conventional testing apparatus.

Referring to FIG. 1, a conventional ramp tester such as the Type No. 730 available from Michel Electronics Corporation for aircraft reporting systems, includes an interrogator 22, a pressure varying means 23, a standard altimeter 24, preferably an aneroid barometer, and an antenna 24 for transmitting the interrogate signals to the aircraft and for receiving the encoded reply from the aircraft's transponder 31. In use, the pressure varying means is connected to the aircraft's altimeter 33 and the pressure is varied over a known altitude range. The transponder 31 of the aircraft's altitude reporting system is then interrogated by the interrogator 22 and the transponder 31 response is compared to the altitude reading of the tester's altimeter.

It has been found that even though the altitude reporting system of an aircraft passes the ground interrogation testing by the conventional ramp tester, the aircraft altitude reporting system fails to perform adequately in flight in that the aircraft transponder occasionally transmits false altitude readings. It is believed that these spurious readouts by the transponder were not detected by the conventional ramp testers, perhaps because of the failure of the ramp tester to imitate in some way the interrogation performed during actual in-flight operation by a ground-based radar system. Such a ground based radar system includes an antenna that has a sweep rate of 12 RPM and an active beam pattern of eight to ten degrees. It was determined after exposing a "bad" transponder to a ground interrogation performed over a complete range of pulse repetition rates, that the transponder would momentarily transmit the spurious bit of information at a pulse repetition rate that was much lower than the pulse repitition rate it was exposed to in flight. This may be due to a number of factors: (1) the transponder detects only a pulse repetition rate equivalent to the rate which causes transmission of the spurious bit; (2) the sweep rate and active beam pattern of a ground station's radar simulates a much lower pulse repetition rate; or (3) there are certain beam frequencies produced by the ground station radar that are not produced by a ramp tester. Whatever the source of the problem, the tester of the present invention is believed to overcome the problem.

Figure 2:
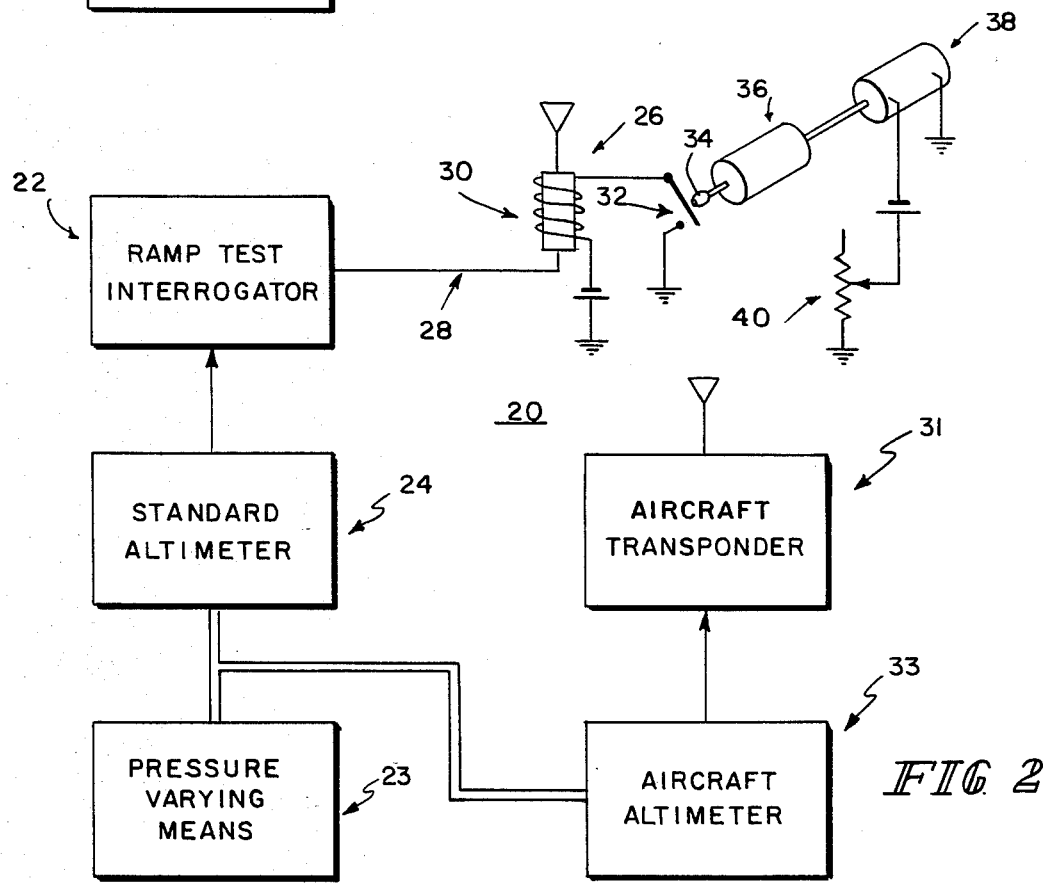
FIG. 2 is a block diagram of a testing apparatus made in accordance with the present invention.

Referring to FIG. 2, an improved aircraft altitude reporting testing system 20 in accordance with the present invention is shown. The tester 20 includes a conventional ramp tester such as the Type No. 730 available from Michel Electronics Corporation. The ramp tester includes an interrogator, 22 a pressure varying means, 23 a standard altimeter 24, preferably an aneroid barometer, and a portable antenna 26 for transmitting the interrogate signals to the aircraft and for receiving the encoded reply from the aircraft's transponder 31 of the aircraft's altimeter 33 reading. The ramp tester 22 is connected to the antenna 26 by a coaxial cable 28 including a relay 30. The relay 30 is opened and closed by an interrupt switch 32 driven by cam 34. The opening and closing of the switch 32 is controlled by a speed reducer 36 driven by motor 38 which includes a variable speed control 40, and powered by a power source.

In use, switch 32 may be controlled to open and close the relay at any desired rate dependent upon need. By opening and closing switch 32, the interrogation of the aircraft's transponder system by the ramp tester is interrupted intermittently, thus giving the user the ability to imitate the actual conditions to which the transponder system normally responds. It is believed that by interrupting the signal between the ramp test interrogator and the antenna, the test system of the present invention more closely approximates the sweep of a ground station's radar.

By utilizing the testing system of the present invention, an on-ground interrogation of an aircraft's altitude reporting system can be performed that reliably determines the overall accuracy of the reporting system.

What is claimed is:

1. In an improved aircraft altitude reporting test system including a ramp tester, an antenna, and means for coupling the ramp tester to the antenna, the improvement comprising
    means for interrupting the circuit between the ramp tester and the antenna.

2. The tester of claim 1 wherein the means for interrupting the circuit between the ramp tester and the antenna comprises means for interrupting at a selected frequency.

3. The tester of claim 2 wherein the means for interrupting the circuit between the ramp tester and the antenna further comprises means for interrupting at a selected period.

4. The tester of claim 1 wherein the means for coupling ramp tester to the antenna comprises a coaxial relay.

5. The tester of claim 4 wherein the relay includes a control winding and the means for interrupting the circuit includes means for energizing a circuit including the control winding.

6. The tester of claim 5 wherein the means for energizing the circuit including the control winding includes a motor, a variable speed control, means for coupling the variable speed control to the motor, a cam, means for operatively coupling the cam to the motor, a switch controlled by the cam, and means for coupling the switch to the control winding.

7. The tester of claim 6 wherein the means for coupling the cam to the motor comprises a speed reducer.

8. The tester of claim 5 wherein the means for interrupting the circuit comprises means for interrupting the circuit at a frequency which simulates the in-flight conditions that the aircraft altitude reporting system encounters.

9. In a method of testing an aircraft altitude reporting system including interrogating an aircraft's transponder, and driving the aircraft altimeter through an altitude range, the improvement comprising
    intermittently interrupting the signal path between the interrogator and the aircraft's transponder.

10. The method of claim 8 wherein the step of interrupting comprises the step of interrupting at a selected frequency.

* * * * *